United States Patent
Magnouloux

(10) Patent No.: US 8,322,564 B2
(45) Date of Patent: Dec. 4, 2012

(54) COOKING ARTICLE WITH FOLDING HANDLE

(75) Inventor: Guy Magnouloux, Pringy (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 13/176,811

(22) Filed: Jul. 6, 2011

(65) Prior Publication Data

US 2012/0006827 A1    Jan. 12, 2012

(30) Foreign Application Priority Data

Jul. 6, 2010  (FR) ...................... 10 55466

(51) Int. Cl.
*B65D 25/10* (2006.01)

(52) U.S. Cl. ........ 220/763; 220/758; 220/759; 220/764; 16/426

(58) Field of Classification Search .................. 220/763, 220/764, 759, 772, 758, 770; 219/440; 16/110.1, 16/426, 408

See application file for complete search history.

(56) References Cited

U.S. PATENT DOCUMENTS

| | | | | |
|---|---|---|---|---|
| 3,115,229 A | * | 12/1963 | Hermann | 16/408 |
| 6,220,477 B1 | * | 4/2001 | Schneider | 220/763 |
| 6,685,048 B1 | | 2/2004 | Ranzoni et al. | |
| 6,824,004 B1 | * | 11/2004 | Wooderson | 220/318 |
| 7,575,128 B2 | * | 8/2009 | Schutz | 220/759 |
| 2005/0127063 A1 | * | 6/2005 | Garziera | 219/440 |

FOREIGN PATENT DOCUMENTS

| | | |
|---|---|---|
| DE | 9105175 U1 | 6/1991 |
| EP | 0999777 A1 | 5/2000 |
| EP | 1541074 A1 | 6/2005 |
| WO | 9905948 A1 | 2/1999 |

* cited by examiner

*Primary Examiner* — J. Gregory Pickett
*Assistant Examiner* — Raven Collins
(74) *Attorney, Agent, or Firm* — The Webb Law Firm

(57) ABSTRACT

Cooking article (1) consists of a vessel (3) with a bottom surface (4) and a lateral surface (5), and at least one handle (10) and 11) attached to lateral surface (5) formed by assembly one (20) and assembly two (40), with each assembly (20 and 40) connected to vessel (3) to pivot between a storage position and a working position in which the two assemblies (20 and 40) form a single unit extending radially to lateral surface (5). Each assembly (20 and 40) is essentially aligned with the lateral surface (5) and assembly two (40) contains a gripping section (47) which extends above vessel (3) to allow a user to hold the cooking article (1) when inserting it into or removing it from a similar, slightly larger cooking article (2).

8 Claims, 2 Drawing Sheets

COOKING ARTICLE WITH FOLDING HANDLE

BACKGROUND OF THE INVENTION

1. Field of the Invention

This invention covers a cooking article: more specifically, a casserole or stewpot (faitout), with folding handles.

2. Description of the Prior Art

Document EP0999777 covers a cooking article with a vessel and two pivoting handles attached to the vessel which shift between a working position in which the handles extend radially from the vessel and a storage position in which the handles are folded close to the vessel.

However, such a cooking article with the handles in the storage position can only be placed on top of another, similar, slightly larger cooking article. The vessel of this cooking article may not in any case be placed completely within the vessel of a slightly larger cooking article to form a stable stack that takes up minimal volume.

Also, document EP1541074 covers a cooking article consisting of a vessel and two pivoting handles attached to the vessel which shift between an extended, working position in which the handles extend radially from the vessel and a storage position in which the handles are lowered alongside the vessel. The cooking article with the handles in the storage position may be inserted into or removed from a similar, slightly larger cooking article. Therefore, several cooking articles may be stored by placing them inside one another.

However, with this type of stacking, the space between two vessels is reduced and does not allow the fingers of the user's hand to hold or grasp one cooking article when it is placed within another. When inserting one cooking article into another cooking article, there is no gripping section to allow the user to hold the cooking article until it is in its final storage position within the other cooking article. When removing one cooking article stored within another cooking article, the user does not know how to grip it and must come up with a method himself, e.g., turning all of the cooking articles over to slide one from inside the other. During this process, the impact and rubbing of the cooking articles against one another damages them.

The purpose of this invention is to eliminate the aforementioned disadvantages and offer a cooking article with optimized ergonomics to allow the user to move it in a completely safe manner and easily store it within a similar, slightly larger cooking article.

Another purpose of the invention is to offer a cooking article the vessel of which may be completely enclosed within the vessel of a slightly larger cooking article to form a stable stack that takes up minimal volume.

Another purpose of the invention is to provide a cooking article with a simple and economic working design.

SUMMARY OF THE INVENTION

These purposes are achieved with a cooking article that consists of a vessel with a bottom surface and a lateral surface, at least one handle attached to the lateral surface which consists of two assemblies, with each assembly connected to the vessel in such a manner to allow it to pivot between a storage position and a working position in which the two assemblies form a single assembly extending radially from the lateral surface, and, when in the storage position, each assembly is essentially parallel to the lateral surface; assembly two contains a gripping section that extends above the vessel to allow the user to hold the cooking article while inserting it into or removing it from a similar, slightly larger cooking article.

The gripping section extending above the vessel in the storage position allows the user to easily grasp the cooking article or to store it inside another cooking article by lowering it until it is completely inserted, or to remove it from a stacked position within another cooking article in the opposite manner. Therefore, the impact and rubbing of the cooking articles against one another can be eliminated.

An advantage is that assemblies one and two are articulated around a rotational axis parallel to the bottom surface.

This arrangement creates a handle, which causes little interference, and which extends radially to the lateral surface in the storage position. The handle is divided into two assemblies: the first extends downward along the lateral surface and the second extends vertically upward.

It is preferable that assemblies one and two be locked to one another in the working position to form a single unit.

This arrangement allows the user to move the cooking article in a completely safe manner. The two assemblies are locked in the working position to form the equivalent of a handle made from a single assembly. The locking of the two assemblies is strengthened by the weight of the cooking article itself when moving it.

An advantage is that assemblies one and two are connected when they each rotate.

This arrangement allows the user to shift the two handle assemblies between the working and storage positions with one hand. A cooking article often has two handles diametrically opposed on the vertical surface of the vessel; therefore, the user can easily move each handle at the same time with one hand.

Preferably, assemblies one and two each contain a toothed section forming a gear.

This arrangement permits particularly economic rotation with assemblies one and two working together.

An advantage is that the handle contains a mechanism to return assemblies one and two to the working position.

This arrangement allows a transition from the storage position to the working position automatically and makes it easier to lock the two assemblies in the working position.

This arrangement also defaults to the working position, which is normally used to prepare food and, therefore, avoids burning the outside of assembly one which, in the storage position, would remain angled downward, too close to the heat source.

Preferably, the method for returning assemblies one and two to the working position includes at least one spring.

This arrangement allows the return mechanism to be used in a particularly economic manner.

An advantage is that the cooking article contains a lid designed to rest on the rim of the lateral surface and includes a highest point; the gripping section extends a maximum of two centimeters above the vessel, i.e., above the highest point of the lid when it is placed on the cooking article.

"Highest point of the lid" means the highest point relative to the working surface on which the cooking article stands.

Preferably, the gripping section which extends above the vessel does not extend above the highest point.

Therefore, the highest point and the edge of the gripping section form a plane that parallels the bottom surface, which limits the height of the cooking article. When stacking the cooking article with its lid on inside a slightly larger cooking article, this plane corresponds to the plane formed by the internal face of the lid of the slightly larger cooking article.

An advantage is that the cooking article is a casserole or stewpot.

BRIEF DESCRIPTION OF THE DRAWINGS

The invention works best with if constructed (but in no way limited to) as shown in the attached figures, in which.

DETAILED DESCRIPTION OF THE INVENTION

Figure 1:
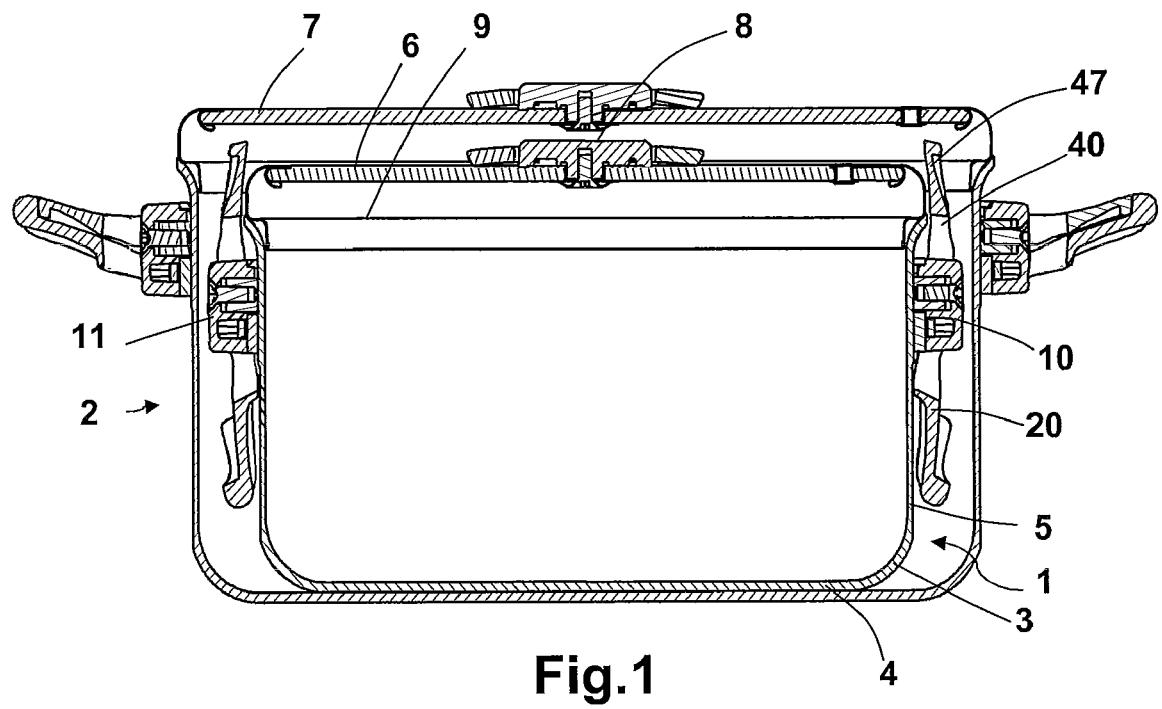
FIG. 1 shows a cross section of a cooking article inserted within another cooking article according to one embodiment of the invention.

As shown in FIG. 1, cooking article (1) contains vessel (3) with a basically cylindrical shape, including bottom surface (4), lateral surface (5) (which is basically vertical) and an upper end forming the edge of opening (9) through which food may be placed in the article. Two handles (10 and 11) are attached to lateral surface (5) in a diametrically opposed orientation. Cooking article (1) may include a lid (6) with two folding handles of the type described in document EP1871206 designed to rest on the edge of the upper end of the lateral surface to close opening (9). Cooking article (1) is inserted into similar, slightly larger cooking article (2) which may also include lid (7).

Figure 2:
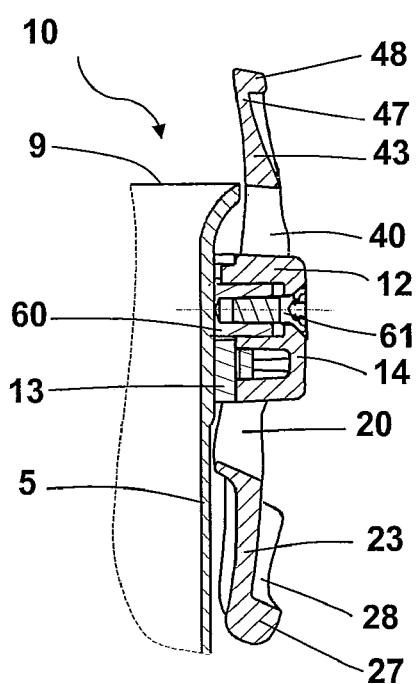
FIG. 2 shows a cross section of the cooking article's handle shown in FIG. 1 in the storage position.
Figure 3:
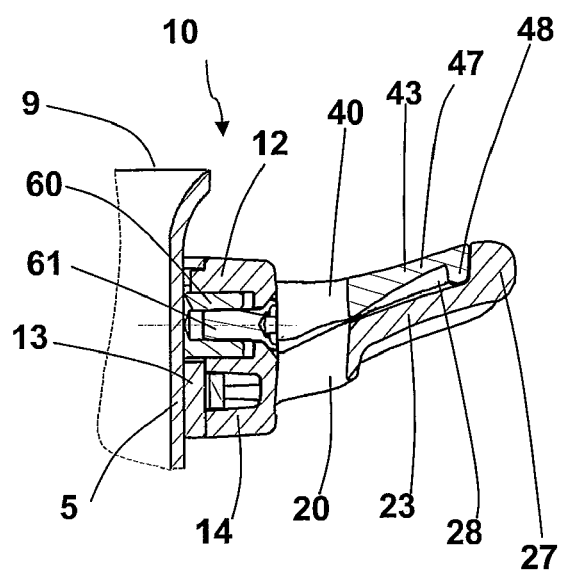
FIG. 3 shows a cross section of the cooking article's handle shown in FIG. 1 in the working position.
Figure 4:
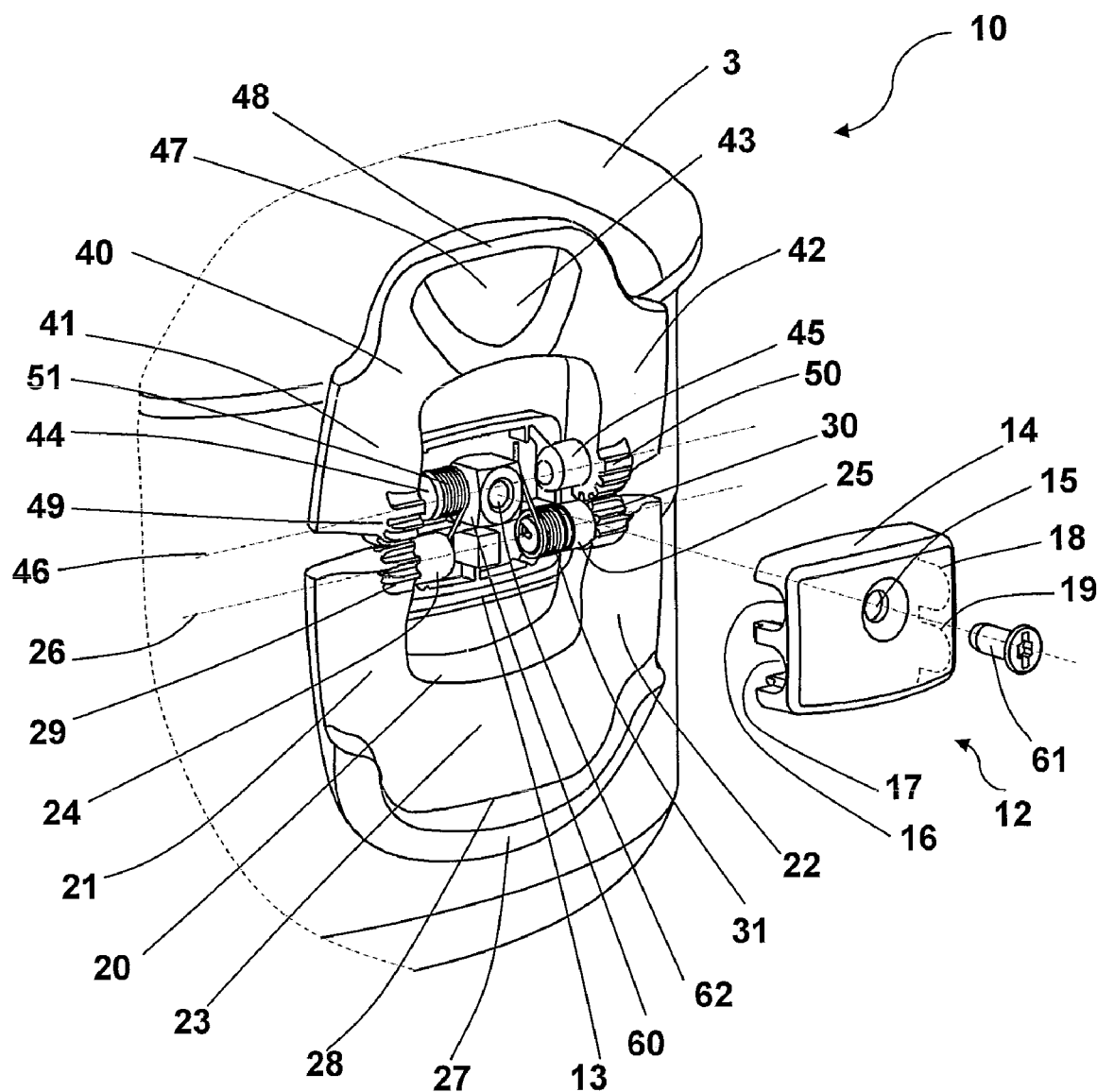
FIG. 4 shows an expanded view of the cooking article's handle shown in FIG. 1 in the storage position.

As shown in to FIGS. 2, 3 and 4, handle (10) contains base section (12) attached to lateral surface (5). Assembly one (20) and assembly two (40) pivot within base section (12). Assembly one (20) and assembly two (40) form a U shape. Thus, each assembly (20 and 40) forms two branches (21, 22, 41 and 42) linked by a circular section forming free extensions (23 and 43). At the end of each branch of the U, bearings (24, 25, 44 and 45) are attached and extend to the interior of the U. Bearings (24, 25, 44 and 45) located at the end of each branch of the U form rotational axes (26 and 46) to create assembly one (20) and assembly two (40), respectively. The two rotational axes (26 and 46) are superimposed on and parallel to bottom surface (4).

Assembly one (20) and assembly two (40) are connected on base section (12) and pivot between the storage position, in which each assembly (20 and 40) is arranged vertically, essentially parallel to lateral surface (5) (FIGS. 2 and 4), and the working position, in which the two assemblies (20 and 40) form a single unit which extends radially from the lateral surface, in an essentially horizontal orientation (FIG. 3). Accordingly, handle (10) is divided into two assemblies (20 and 40) and, in the storage position, creates less radial interference with the lateral surface. For example, for stackable cooking articles with a diameter of 18, 22 and 26 centimeters, there is a difference in diameter of approximately four centimeters. Therefore, in the storage position, base section (12), assembly one (20) and assembly two (40) extend radially a maximum of two centimeters toward inner vertical surface (5).

With the invention, in the storage position, assembly two (40) is aligned upward to vertical surface (5) and includes gripping section (47) which extends above the vessel (3). Gripping section (47) is sized to allow the user's hand to easily hold it when he wishes to remove cooking article (1) stacked inside another, slightly larger cooking article (2). Gripping section (47) is also sized to allow the user, when he wishes to stack these two cooking articles, to hold cooking article (1) until it reaches its final storage position within the other cooking article (2). Gripping section (47) contains an end with rim (48), to prevent the user's fingers from sliding when moving cooking articles to store them.

As shown in FIG. 1, lid (6) has a highest point (8) that forms a plane parallel to the working surface. Gripping section (47) extends to this plane. Cooking article (2), which is slightly larger, is sized so that the internal face of lid (7) is positioned just above the plane of highest point (8).

In the working position (FIG. 3), assembly two (40) extends radially from the vessel wall and is essentially horizontal and assembly one (20) extends radially from the vessel wall, angled upward. Free end (23) of assembly one (20) includes peripheral extension (27), which extends upward to form housing (28) to accept free end (43) of assembly two (40). Therefore, in the working position, free end (43) of assembly two (40) is recessed within housing (28) of free end (23) of assembly one (20) to form a single unit gripped by the user when he uses the cooking article.

When the user lifts cooking article (1), free end (43) of assembly two (40) presses against and exerts a force on peripheral extension (27) of assembly one (20) to lock both assemblies (20 and 40). Accordingly, in this working position, assembly two (40) prevents the assembly one (20) from rotating upward. The greater the weight of cooking article (1) and the food that it contains, the greater the strengthening force and, as a result, the stronger the lock.

As shown in FIG. 4, base section (12) contains a base (13) and a hood (14) that include four housings (16, 17, 18 and 19). Bearings (24, 25, 44 and 45) fit into each housing (16, 17, 18 and 19). Lateral surface (5) of cooking article (1) contains a stud (60) which is soldered and includes tapped hole (62). Hood (14) contains a transverse opening (15) allowing fixing screw (61) to be inserted. Base section (12) is attached to lateral surface (5) by tightening screw (61) in the tapped hole.

The ends of each branch (21, 22, 41 and 42) of assembly one (20) and assembly two (40) contain toothed sections (29, 30, 49 and 50) surrounding rotational axes (26 and 46), which together form a gear. Assembly one (20) and assembly two (40) each contain torsion springs (31 and 51) located adjacent to bearings (25 and 44) to return the two assemblies (20 and 40) to their working position.

To store cooking article (1) when standing on a working surface in another, slightly larger cooking article (2), the user pushes with the palm of his hand on free end (23) of assembly one (20) to pivot and cause assembly two (40) to rotate using toothed sections (29, 30, 49 and 50). The user then grasps gripping section (47) and moves assembly two (40) into a vertical position; which results in assembly one (20) also moving into a vertical position, aligned with lateral surface (5). In this storage position, gripping section (47) is located above vessel (3) and allows the user to hold cooking article (1) and insert it completely into the other, slightly larger cooking article (2) without releasing it.

Of course, the invention is in no manner limited to the embodiments described and the illustrations are provided only as examples. Additional variations are possible, in particular, from the point of view of adding other items or by substituting technical equivalents, without, however, falling outside the protected scope of the invention.

Therefore, the handle, in one embodiment, consists of a stop that shifts between a position to hold assemblies one and two in a storage position and a position to release assemblies one and two. Accordingly, a storage position is created for the stable handle when the movable stop is in the hold position. When the movable stop is released, assemblies one and two pivot to the working position under pressure from the return spring.

The invention claimed is:

1. Cooking article comprising a vessel equipped with a bottom surface and a lateral surface, at least one handle attached to lateral surface, comprising assembly one and assembly two, each assembly connected to vessel to pivot between a storage position and a working position in which the two assemblies form a single unit extending radially to the lateral surface, in which, in the storage position, each assembly is essentially aligned with the lateral surface; assembly two contains a gripping section extending above the vessel to allow a user to hold the cooking article when inserting the cooking article into or removing it from a similar, slightly larger cooking article, wherein assembly one and assembly two are linked in respective rotational axes, by toothed sections, forming a gear.

2. The cooking article of claim 1 comprising assembly one and assembly two connected around rotational axes parallel to the bottom surface.

3. The cooking article of claim 1 comprising assembly one and assembly two locked to one another in the working position to form a single unit.

4. The cooking article of claim 1 comprising a handle with a mechanism to return assembly one and assembly two to their working position.

5. The cooking article of claim 1 comprising assembly one and assembly two with a mechanism to return them to working position using at least one spring.

6. The cooking article of claim 1 including a lid designed to rest on a rim of the lateral surface and defining a highest point; a gripping section, which extends above the vessel, extending a maximum of two centimeters above the highest point of the lid when the lid is placed on the cooking article.

7. The cooking article of claim 1 including a lid designed to rest on a rim of the lateral surface and defining a highest point; gripping section, which extends above the vessel, but does not extend above the highest point.

8. The cooking article of claim 1 in the form of a casserole or a stewpot.

* * * * *